(12) United States Patent
Kim et al.

(10) Patent No.: US 12,294,069 B2
(45) Date of Patent: May 6, 2025

(54) BATTERY MODULE AND MANUFACTURING METHOD THEREOF

(71) Applicant: LG Energy Solution, Ltd., Seoul (KR)

(72) Inventors: Min Seop Kim, Daejeon (KR); Junyeob Seong, Daejeon (KR); Myungki Park, Daejeon (KR); Sunghwan Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 538 days.

(21) Appl. No.: 17/640,622

(22) PCT Filed: Mar. 11, 2021

(86) PCT No.: PCT/KR2021/003032
§ 371 (c)(1),
(2) Date: Mar. 4, 2022

(87) PCT Pub. No.: WO2021/215661
PCT Pub. Date: Oct. 28, 2021

(65) Prior Publication Data
US 2022/0407138 A1    Dec. 22, 2022

(30) Foreign Application Priority Data
Apr. 22, 2020 (KR) ........................ 10-2020-0048916

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC ............ H01M 10/653; H01M 10/613; H01M 10/625; H01M 10/647; H01M 50/186;
(Continued)

(56) References Cited

U.S. PATENT DOCUMENTS

| | | | |
|---|---|---|---|
| 2010/0310911 A1 | 12/2010 | Yamamoto et al. | |
| 2016/0233465 A1 | 8/2016 | Lee et al. | |

(Continued)

FOREIGN PATENT DOCUMENTS

| | | | |
|---|---|---|---|
| CN | 106025423 A | 10/2016 | |
| CN | 108370075 A | 8/2018 | |

(Continued)

OTHER PUBLICATIONS

Extended European Search Report including Written Opinion for Application No. 21792619.5 dated May 14, 2024, pp. 1-8.

(Continued)

*Primary Examiner* — Daniel S Gatewood
(74) *Attorney, Agent, or Firm* — Lerner David LLP

(57) ABSTRACT

A battery module includes a battery cell stack in which a plurality of battery cells are stacked within a case body; a module frame for accommodating the battery cell stack; and a thermal conductive resin layer formed between a lower surface of the module frame and the battery cell stack. The plurality of battery cells comprise sealing parts that extend downward from the bottom surface of the cell case body such that each one of the sealing parts is located inside the thermal conductive resin layer, and is folded toward the bottom surfaces of the cell case body to accommodate an adhesive layer between the folded portion of the sealing part and the bottom surface of the cell case body.

10 Claims, 7 Drawing Sheets

(51) Int. Cl.
  *H01M 10/625* (2014.01)
  *H01M 10/647* (2014.01)
  *H01M 50/186* (2021.01)
  *H01M 50/211* (2021.01)

(52) U.S. Cl.
  CPC ....... *H01M 10/647* (2015.04); *H01M 50/186* (2021.01); *H01M 50/211* (2021.01)

(58) Field of Classification Search
  CPC ............. H01M 50/211; H01M 50/595; H01M 2220/20; H01M 50/249; H01M 50/20; H01M 10/659; H01M 50/24; Y02E 60/10
  See application file for complete search history.

(56) References Cited

U.S. PATENT DOCUMENTS

| | | |
|---|---|---|
| 2018/0019508 A1 | 1/2018 | Lee et al. |
| 2018/0241023 A1 | 8/2018 | Lim et al. |
| 2018/0331336 A1* | 11/2018 | Choi .................. H01M 10/613 |
| 2020/0006823 A1* | 1/2020 | Chung .............. H01M 10/0413 |
| 2020/0111999 A1 | 4/2020 | Kim et al. |
| 2020/0235360 A1 | 7/2020 | Lim et al. |

FOREIGN PATENT DOCUMENTS

| | | | |
|---|---|---|---|
| CN | 109997242 A | | 7/2019 |
| CN | 110676536 A | | 1/2020 |
| CN | 210142673 U | | 3/2020 |
| JP | 2010282795 A | | 12/2010 |
| JP | 2014-049224 A | | 3/2014 |
| JP | 2017526102 A | | 9/2017 |
| JP | 2019508846 A | | 3/2019 |
| JP | 2020017469 A | | 1/2020 |
| KR | 20160041402 A | * | 4/2016 |
| KR | 20160077871 A | | 7/2016 |
| KR | 20170049014 A | | 5/2017 |
| KR | 20170055144 A | | 5/2017 |
| KR | 20180020546 A | | 2/2018 |
| KR | 20180117783 A | | 10/2018 |
| KR | 20190088834 A | | 7/2019 |
| KR | 20200003600 A | | 1/2020 |

OTHER PUBLICATIONS

Search Report dated Jun. 24, 2024 from the Office Action for Chinese Application No. 202180005213.1 issued Jun. 25, 2024, 3 pages.
International Search Report for PCT/KR2021/003032 dated Jul. 5, 2021. 3 pgs.

* cited by examiner

[FIG. 1]

[FIG. 3]
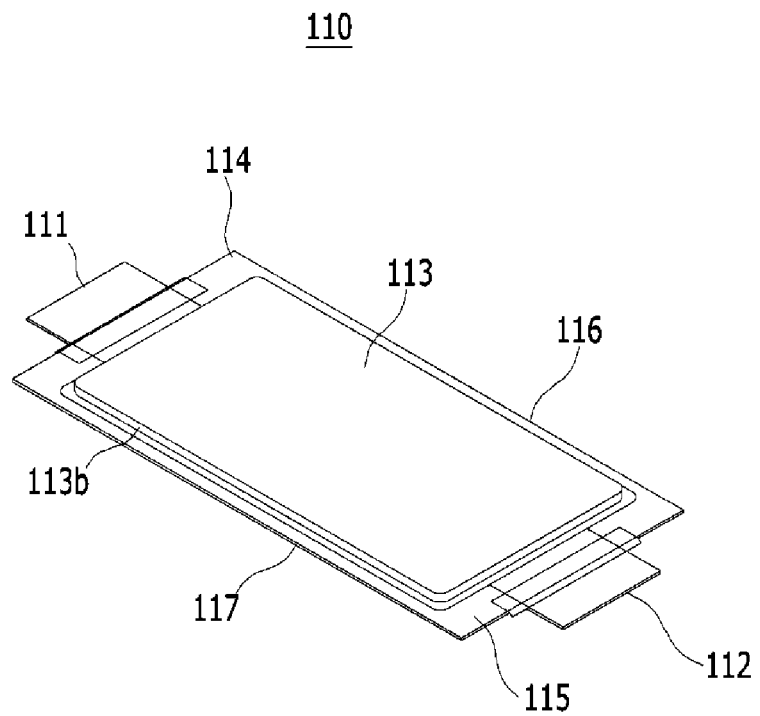

[FIG. 4]
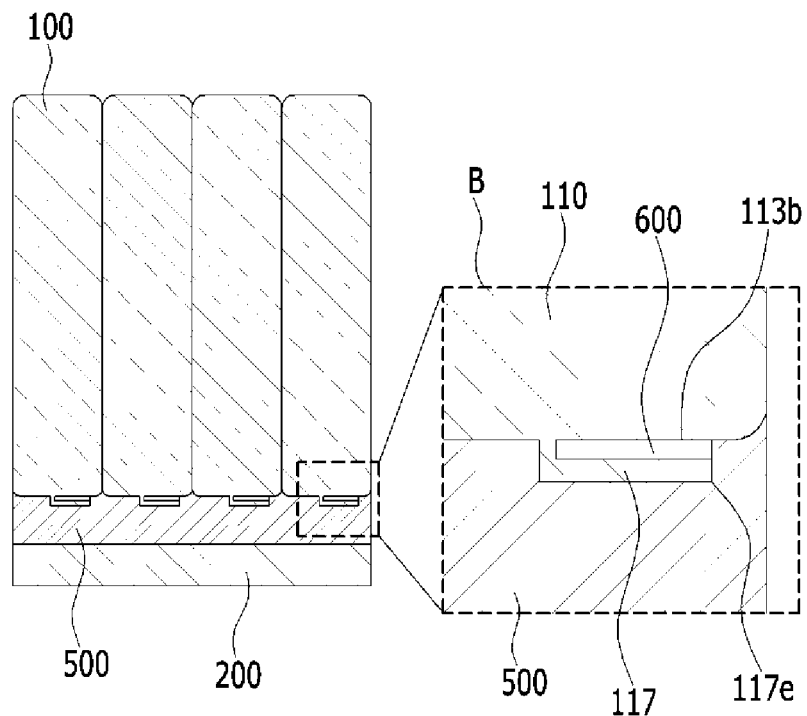
[FIG. 5]
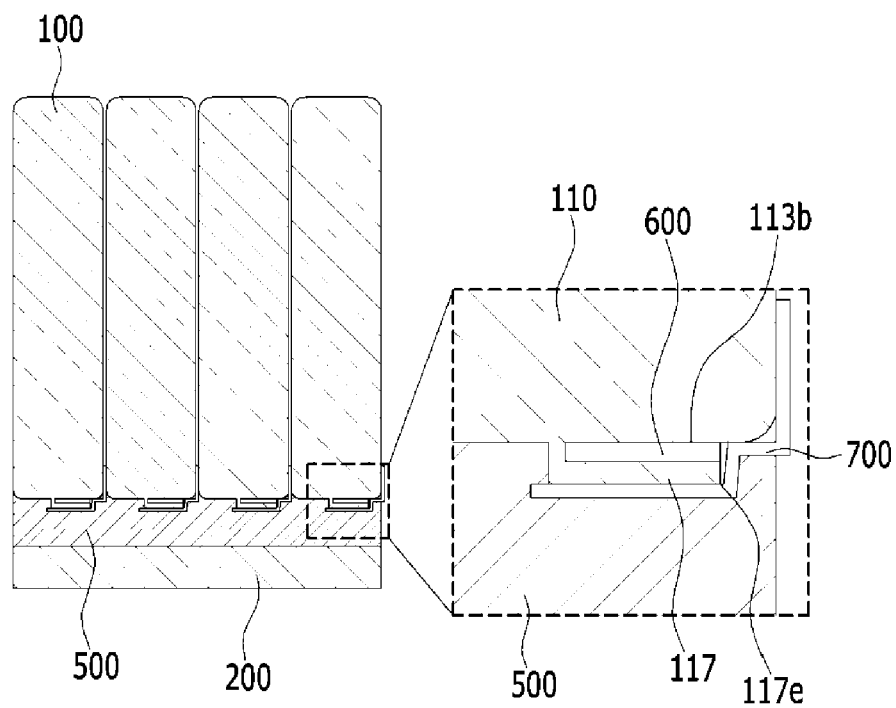

[FIG. 6]
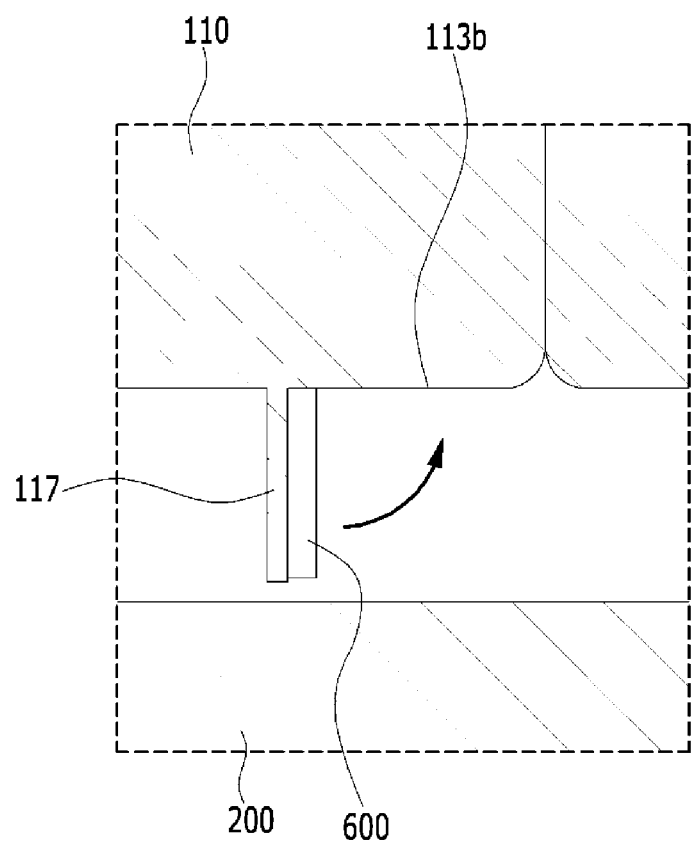

[FIG. 7]
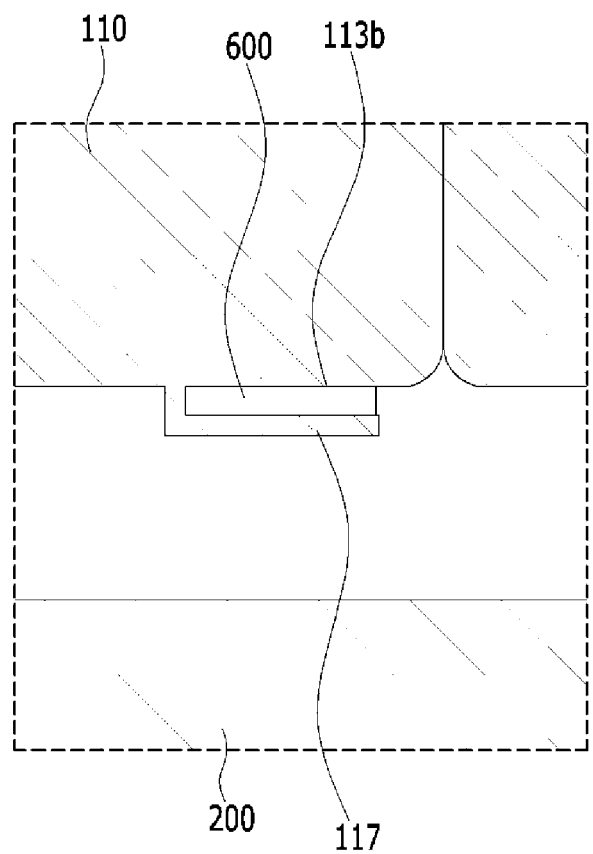

[FIG. 8]
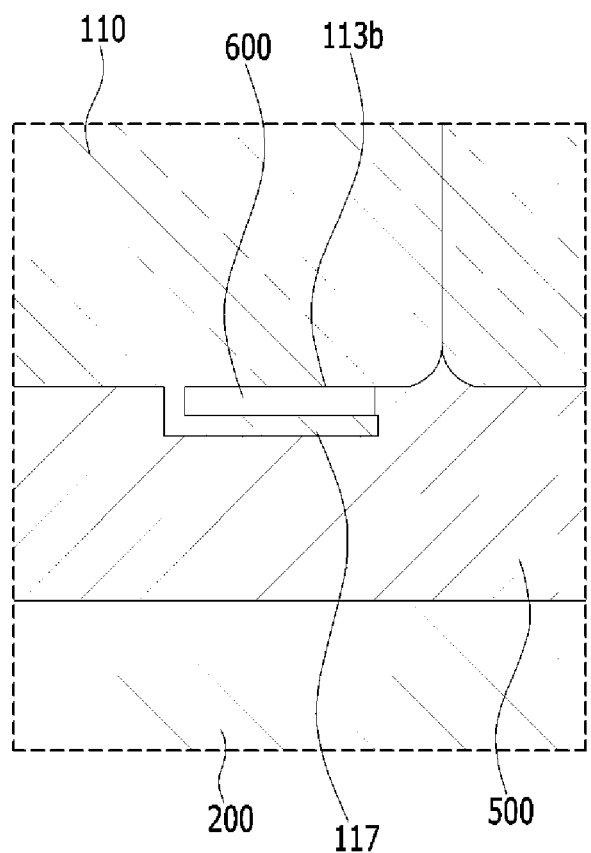

BATTERY MODULE AND MANUFACTURING METHOD THEREOF

CROSS-REFERENCE TO RELATED APPLICATIONS

This application is a national phase entry under 35 U.S.C. § 371 of PCT/KR2021/003032, filed on Mar. 11, 2021, which claims the benefit of Korean Patent Application No. 10-2020-0048916 filed on Apr. 22, 2020 with the Korean Intellectual Property Office, the disclosures of which are incorporated herein by reference in their entireties.

TECHNICAL FIELD

The present disclosure relates to a battery module and a method for manufacturing the same, and more particularly, to a battery module having improved cooling performance and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery cell may include a battery cell stack in which a plurality of battery cells are stacked, a module frame for accommodating the battery cell stack, and a thermal conductive resin layer formed between a lower surface of the module frame and the battery cell stack.

FIG. 1 is a view illustrating a state in which an air layer is formed between a sealing part of a battery cell and a bottom surface of the battery cell in a conventional battery module.

Referring to FIG. 1, according to the conventional battery module, a thermal conductive resin layer 30 is formed between the battery cell stack in which a plurality of battery cells 10 are stacked and the module frame 20. A sealing part 11 extends from a cell case body of the battery cell 10 and comes into contact with the thermal conductive resin layer 30. In this case, the sealing part 11 is made to come into contact with the thermal conductive resin layer 30 in a state of being folded toward the bottom surface 10a of the battery cell such that it is capable of utilizing the space under the battery cell stack 100.

However, when the sealing part 11 is folded as shown in FIG. 1, an air layer may be formed between the folded portion of the sealing part 11 and the portion of the battery cell bottom surface 10a corresponding to the folded portion of the sealing portion 11. Due to the air layer, a gap is generated between the thermal conductive resin layer 30 and the battery cells 10, which causes a problem that the cooling performance of the battery module is deteriorated.

DETAILED DESCRIPTION OF THE INVENTION

Technical Problem

It is an object of the present disclosure to provide a battery module having improved cooling performance and a method for manufacturing the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a battery cell stack in which a plurality of battery cells are stacked within a cell case body; a module frame for accommodating the battery cell stack; and a thermal conductive resin layer formed between a lower surface of the module frame and the battery cell stack, wherein the plurality of battery cells comprises sealing parts that extend downward from a bottom surface of the cell case body, wherein the sealing parts are located inside the thermal conductive resin layer, and are respectively folded toward the bottom surface of the cell case body, and wherein an adhesive layer is formed between the folded portion of the sealing part and the bottom surface of the cell case body.

The battery module may further include a fixing member that covers the folded portion of the sealing part.

The fixing member may cover the end of the sealing part.

The fixing member may cover an outer surface of the folded portion of the sealing part, an end of the sealing part, the bottom surface of the cell case body, and a part of the body surface of the cell case body.

The fixing member may be formed of an insulating material.

The adhesive layer may be formed of a double-sided tape or an adhesive.

The adhesive layer may be formed of a thermal interface material.

The adhesive layer may be fixed between the folded portion of the sealing part and the bottom surface of the cell case body.

In order to achieve the above object, according to another embodiment of the present disclosure, there is provided a method for manufacturing a battery module, comprising the steps of: inserting an adhesive material between sealing parts that extend downward from a plurality of battery cells contained in a battery cell stack, and bottom surfaces of the plurality of battery cells; fixing the adhesive material between the sealing parts and the bottom surfaces, respectively, by folding the sealing parts toward the bottom surface of the plurality of battery cells; and injecting a thermal conductive resin between a lower side of the battery cell stack and a lower surface part of the module frame so as to be in contact with the sealing parts, thereby forming a thermal conductive resin layer.

After the fixing step, the method may further include a step of attaching a fixing member to cover each of the folded sealing parts.

According to yet another embodiment of the present disclosure, a battery pack comprising the above-mentioned battery module is provided.

Advantageous Effects

A battery module and a method for manufacturing the same according to an embodiment of the present disclosure provide the effect of improving cooling performance and insulation performance of the battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 3 is a view illustrating a battery cell according to an embodiment of the present disclosure;

FIG. 4 is a cross-section taken along line A-A of FIG. 2, which is a view illustrating a state in which an adhesive layer is formed according to an embodiment of the present disclosure;

FIG. 5 is a cross-section taken along line A-A of FIG. 2, which is a view illustrating a state in which an adhesive layer is formed according to another embodiment of the present disclosure;

FIG. 6 is enlarged section B in FIG. 4, which is a view illustrating a state in which the adhesive material is inserted between the sealing parts and the bottom surfaces of the battery cell according to an embodiment of the present disclosure;

FIG. 7 is enlarged section B in FIG. 4, which is a view illustrating a state in which the sealing part is folded toward the bottom surface of the battery cell according to an embodiment of the present disclosure; and FIG. 8 is enlarged section B in FIG. 4, which is a view illustrating a state in which the thermal conductive resin is injected into the portion where the sealing parts are located according to an embodiment of the present disclosure.

DETAILED DESCRIPTION OF THE EMBODIMENTS

It should be appreciated that the exemplary embodiments, which will be described below, are illustratively described to assist in the understanding of the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, the battery module according to an embodiment of the present disclosure will be described with reference to FIGS. 2 and 3.

Figure 1:
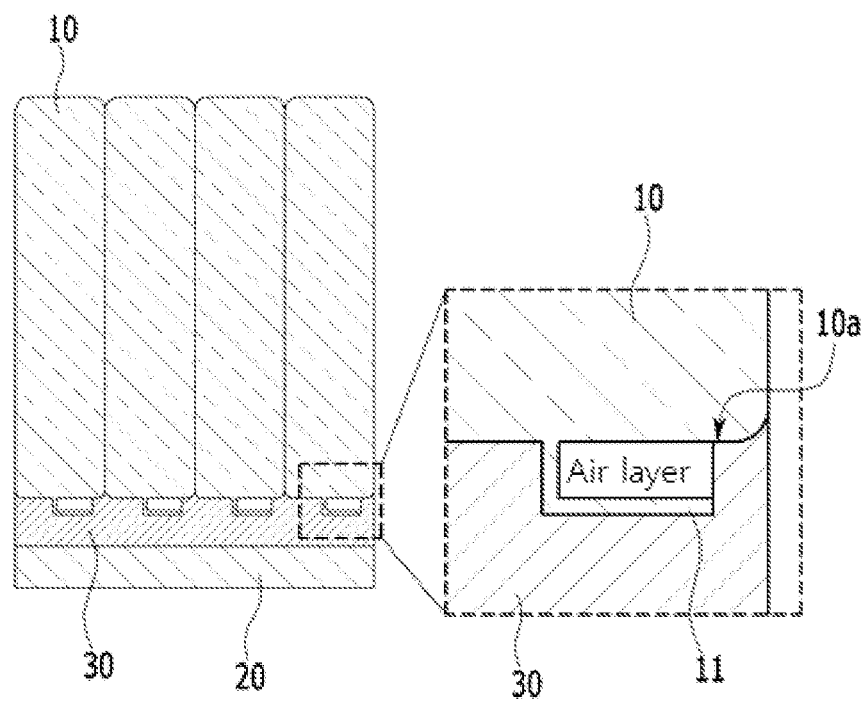
FIG. 1 is a view illustrating a state in which an air layer is formed between a sealing part of a battery cell and a bottom surface of the battery cell in a conventional battery module.
Figure 2:
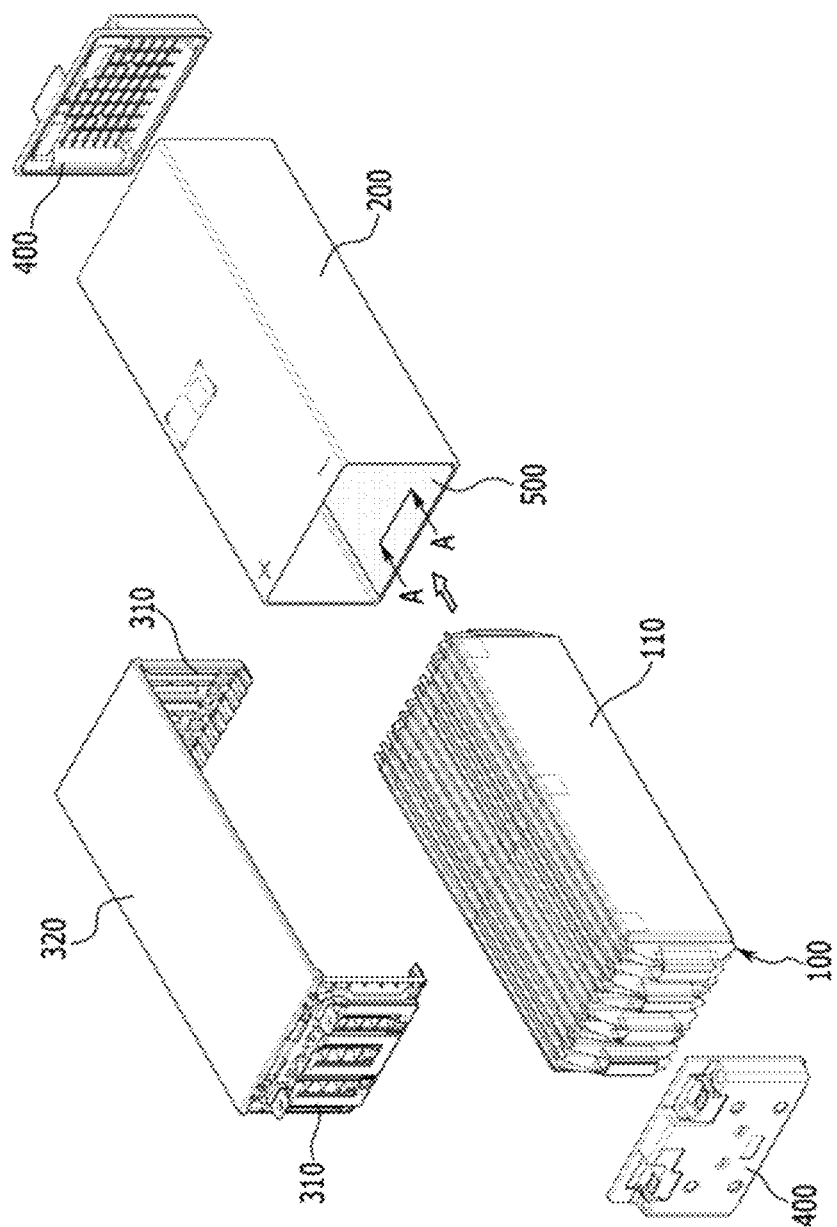
FIG. 2 is an exploded perspective view illustrating a battery module according to an embodiment of the present disclosure.

FIG. 2 is an exploded perspective view illustrating a battery module according to an embodiment of the present disclosure. FIG. 3 is a view illustrating a battery cell according to an embodiment of the present disclosure.

Referring to FIGS. 2 and 3, a battery module according to an embodiment of the present disclosure includes a battery cell stack 100 in which a plurality of battery cells are stacked, a module frame 200 for accommodating the battery cell stack 100, and a thermal conductive resin layer 500 formed between a lower surface of the module frame 200 and the battery cell stack 100.

The battery cell 110 is a secondary battery and may be configured into a pouch-type secondary battery. Such a battery cell 110 may be composed of a plurality of cells, and the plurality of battery cells may be stacked together so as to be electrically connected to each other, thereby forming the battery cell stack 100. As illustrated in FIG. 3, the plurality of battery cells 110 may include electrode leads 111 and 112 protruding from the electrode assembly and a cell case body 113 for accommodating the electrode assembly.

The electrode assembly may include a positive electrode plate, a negative electrode plate, a separator, and the like. The cell case body 113 is for packaging the electrode assembly, and may be composed of a laminate sheet including a resin layer and a metal layer.

The cell case body 113 includes first and second sealing parts 114 and 115 respectively formed so as to extend in a direction in which the first and second electrode leads 111 and 112 are located, and third and fourth sealing parts 116 and 117 connected to the first and second sealing parts and formed so as to extend to the outside of the cell case body from edge portions of the cell case body where the first and second electrode leads 111 and 112 are not formed. The sealing parts 114, 115, 116 and 117 may be respectively formed so as to extend outward from the cell case body 113 and form a four-sided sealing structure capable of sealing the cell case body 113 in which the electrode assembly is accommodated.

The first and second electrode leads 111 and 112 have a structure in which they face each other and protrude from the first sealing part 114 and the second sealing part 115 of the cell case body 113, respectively. The first sealing part 114 and the second sealing part 115 are formed so as to surround the first and second electrode leads 111 and 112, respectively. In the battery cell stack 100, the first and second sealing parts 114 and 115 are formed in the front and rear surface portions of the battery cell stack 100, and the third and fourth sealing parts 116 and 117 are formed in the upper and lower surface portions of the battery cell stack. The third sealing part 116 is formed on the upper surface portion of the battery cell stack 100, and the fourth sealing part 117 is formed in the lower surface portion of the battery cell stack 100. The fourth sealing part 117 formed in the lower surface portion of the battery cell stack 100 can come into contact with the thermal conductive resin layer 500.

The module frame 200 may accommodate the battery cell stack 100, and the bus bar frame 310 and the upper plate 320 coupled thereto at the upper, lower, left and right surfaces of the battery cell stack 100. According to an embodiment of the present disclosure, the module frame 200 may be formed in a mono frame structure in which upper, lower, left, and right surfaces are integrally formed, but the present disclosure is not limited thereto, and a structure formed of a U-shaped frame and an upper plate for covering an upper side of the U-shaped frame can also be employed.

The upper plate 320 may be formed on the upper surface of the battery cell stack 100 to cover the battery cell stack 100. A bus bar frame 310 may be formed at front and rear ends of the upper plate 320. By combining with the front and rear surfaces of the battery cell stack 100 of the bus bar frame 310, an electrical connection between the electrode lead and the bus bar can be guided through a bus bar formed in the bus bar frame 310.

The upper plate 320 and the bus bar frame 310 can be hinge-coupled. When the upper plate 320 and the bus bar frame 310 are coupled to the battery cell stack 100, the upper plate 320 is seated on the upper surface of the battery cell stack 100, and then the bus bar frames 310 at both ends are rotated around a rotation axis formed through hinge coupling with the upper plate 200, thereby it can be mounted so as to cover each on the front and rear surfaces of the battery cell stack 100. According to an embodiment of the present disclosure, the bus bar frame 310 may be mounted on the front and rear surfaces of the battery cell stack 100 so as to be perpendicular to the upper plate 320.

The end plate 400 can be formed on the outside of the battery cell stack 100 and the reference bus bar frame 310 and formed so as to cover the battery cell stack 100 and the bus bar frame 310. The end plate 400 can protect the bus bar frame 310 and various electrical components connected thereto from external impact, and have a battery module mounting structure as a component of the frame.

The thermal conductive resin can be injected between the lower side surface of the battery cell stack 100 and the lower surface part of the module frame 200 to form the thermal conductive resin layer 500. The thermal conductive resin may include a thermal conductive adhesive material, and specifically, it may include at least one of a silicone material, a urethane material, and an acrylic material. The thermal conductive resin is liquid during coating, but is solidified after coating, thereby being able to perform a role of fixing one or more battery cells 110 constituting the battery cell stack 200. In addition, the thermal conductive resin has excellent thermal conductivity, so that the heat generated in the battery cell 110 can be quickly transferred to the outside of the battery module 100 to perform cooling function of the battery module.

Hereinafter, a battery module in which an adhesive layer is formed between the sealing part and the bottom surface of the cell case body according to an embodiment of the present disclosure will be described with reference to FIGS. 2 and 4.

FIG. 4 is a section taken along line A-A of FIG. 2, which is a view illustrating a state in which an adhesive layer is formed according to an embodiment of the present disclosure.

According to the embodiment of the present disclosure, the plurality of battery cells 110 includes fourth sealing parts 117 formed so as to extend downward from the cell case body 113 for accommodating the electrode assembly, the fourth sealing parts 117 are located in the inside of the thermal conductive resin layer 500 and are formed so as to be folded to the bottom surfaces of the cell case body 113, respectively, and an adhesive layer 600 is formed between the folded portion of the fourth sealing part 117 and the bottom surface 113b of the cell case body 113.

Conventionally, an air layer may be formed in the space between the folded portion of the sealing part 117 and the portion of the cell case body bottom surface 113b corresponding to the folded portion of the fourth sealing part 117, and due to the air layer, a gap is generated between the thermal conductive resin layer 30 and the battery cells 10, which causes a problem that the cooling performance of the battery module is deteriorated.

However, according to the embodiment of the present disclosure, the adhesive layer 600 is formed between the folded portion of the fourth sealing part 117 and the bottom surface 113b of the cell case body, so that the folded portion of the fourth sealing part 117 is fixed to the cell case body bottom surface 113b through the adhesive layer 600, and at the same time, the generation of an air layer that can be formed between the folded portion of the fourth sealing part 117 and the cell case body bottom surface 113b is minimized, and as a result, the heat transfer between the thermal conductive resin layer 500 and the plurality of battery cells 110 can be smoothly performed, thereby improving cooling performance of the battery module.

According to the embodiment of the present disclosure, the adhesive layer 600 can be formed of an adhesive material such as a double-sided tape or an adhesive. As a result, in a state where the distance between the fourth sealing part 117 and the cell case body bottom surface 113b is reduced at the maximum, the fourth sealing part 117 and the cell case body bottom surface 113b is fixed, so that a gap between the main body of the battery cell 110 and the thermal conductive resin layer 500 can be reduced, thereby improving cooling performance due to heat transfer.

The adhesive layer 600 may be formed of a thermal interface material (TIM). By forming the adhesive layer 600 as a thermal interface material, heat transfer is smoothly performed through the adhesive layer 600 itself formed of a thermal interface material, in addition to the function of the adhesive layer 600 fixing between the fourth sealing part 117 and the bottom surface 113b of the cell case body, thereby improving the cooling performance of the battery module.

Hereinafter, a battery module having a fixing member according to another embodiment of the present disclosure will be described with reference to FIGS. 2 and 5.

FIG. 5 is a section taken along line A-A of FIG. 2, which is a view illustrating a state in which an adhesive layer is formed according to another embodiment of the present disclosure.

According to the embodiment of the present disclosure, a fixing member 700 formed so as to cover the folded portion of the fourth sealing part 117 may be further included. The fixing member 700 may be formed so as to cover the end 117e of the fourth sealing part 117. Since the end 117e of the fourth sealing part 117 is a part from which the sealing surfaces are cut, and requires insulation processing. Thus, the fixing member 700 is formed so as to cover the end 117e of the fourth sealing part 117, thereby capable of interrupting electrical connection with the outside through the end 117e of the fourth sealing part 117. In order to perform an insulating function, the fixing member 700 may be formed of an insulating material.

Further, the fixing member 700 may be formed so as to cover the outer surface of the folded portion of the sealing part 117, the end 117e of the fourth sealing part 117, the bottom surface 113b of the cell case body 113, and a part of the cell case body surface 113a, as shown in FIG. 5. Thereby, the fixing member 700 allows the folded portion of the sealing part 117 and the bottom surface 113b of the cell case body to fix together with the adhesive layer 600, so that the fixing force between the fourth sealing part 117 and the bottom surface of the cell case body 113b can be further strengthened. Further, one end of the fixing member 700 is attached from the outer surface of the folded portion of the fourth sealing part 117 to a part of the cell case body surface 113a, so that the fixing member 700 can completely cover the bottom surface 113b of the fourth sealing part 117, and the contact area between the fixing member 700 and the battery cell 110 is increased, so that the fixing member 700 can be completely in close contact with the lower portion of the battery cell 110.

Hereinafter, a method of manufacturing a battery module according to an embodiment of the present invention will be described with reference to FIGS. 6 to 8.

FIG. 6 is enlarged section B of FIG. 4, which is a view illustrating a state in which the adhesive material is inserted between the sealing parts and the bottom surfaces of the battery cell according to an embodiment of the present disclosure. FIG. 7 is enlarged section B of FIG. 4, which is a view illustrating a state in which the sealing part is folded toward the bottom surface of the battery cell according to an embodiment of the present disclosure. FIG. 8 is enlarged section B of FIG. 4, which is a view illustrating a state in which the thermal conductive resin is injected into the portion where the sealing parts are located according to an embodiment of the present disclosure.

The manufacturing method of the battery module according to the embodiment of the present disclosure can proceed in the order of a step of inserting an adhesive material 600 between sealing parts 117 formed so as to extend downward from a plurality of battery cells 110 in the battery cell stack 100, and the bottom surfaces 113b of the plurality of battery cells 110 (FIG. 6), a step of fixing between the sealing parts 117 and the bottom surfaces 113b, respectively, by folding the fourth sealing parts 117 in a direction in which the adhesive materials 600 are located (FIG. 7), and a step of injecting a thermal conductive resin between the lower side of the battery cell stack 100 and the lower surface part of the module frame 200 so as to be in contact with the fourth sealing parts 117, thereby forming a thermal conductive resin layer 500 (FIG. 8).

The step of inserting an adhesive material 600 between sealing parts 117 and the bottom surfaces 113b of the plurality of battery cells 110 may include a step of attaching the adhesive material 600 to the inner surface of the fourth sealing part 117. Also, in a modified example, the method may include a step of attaching the adhesive material 600 to the bottom surfaces 113b corresponding to the portion where the fourth sealing part 117 is folded.

After the step of fixing between the sealing parts and the bottom surfaces, respectively, the method may further include a step of attaching the fixing member so as to cover each of the folded sealing parts.

The above-mentioned battery module can be included in the battery module. The battery module may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

200: module frame
310: bus bar frame
320: upper plate
400: end plate
500: thermal conductive resin layer
117: sealing part
117e: end of sealing part
113a: cell case body surface
113b: bottom surface
600: adhesive layer (adhesive material)
700: fixing member

The invention claimed is:

1. A battery module comprising:
a battery cell stack in which a plurality of battery cells are stacked within a cell case body;
a module frame for accommodating the battery cell stack; and
a thermal conductive resin layer formed between a lower surface of the module frame and the battery cell stack,
wherein the plurality of battery cells comprises sealing parts that extend downward from a bottom surface of the cell case body,
wherein the sealing parts are located inside the thermal conductive resin layer, and are respectively folded toward the bottom surface of the cell case body,
wherein an adhesive layer is formed between a folded portion of one of the sealing parts and the bottom surface of the cell case body, and
wherein the battery module further comprises a fixing member that covers the folded portion of the one of the sealing parts.

2. The battery module of claim 1, wherein the fixing member covers an end of the one of the sealing parts.

3. The battery module of claim 1, wherein the fixing member covers an outer surface of the folded portion of the one of the sealing parts, an end of the one of the sealing parts, the bottom surface of the cell case body, and a part of a body surface of the cell case body.

4. The battery module of claim 1, wherein the fixing member is configured to interrupt electrical connection between the one of the sealing parts and a component outside of the cell case body.

5. The battery module of claim 1, wherein the adhesive layer is formed of a double-sided tape or an adhesive.

6. The battery module of claim 1, wherein the adhesive layer is thermally conductive.

7. The battery module of claim 1, wherein the adhesive layer is fixed between the folded portion of the one of the sealing parts and the bottom surface of the cell case body.

8. A method for manufacturing a battery module, comprising:
- inserting an adhesive material between sealing parts that extend downward from a plurality of battery cells contained in a battery cell stack, and bottom surfaces of the plurality of battery cells;
- fixing the adhesive material between the sealing parts and the bottom surfaces, respectively, by folding the sealing parts toward the bottom surface of the plurality of battery cells;
- injecting a thermal conductive resin between a lower side of the battery cell stack and a lower surface part of the module frame so as to be in contact with the sealing parts, thereby forming a thermal conductive resin layer; and
- attaching a fixing member to cover each of the sealing parts.

9. The method of claim 8, wherein the attaching of the fixing member is performed after the fixing step.

10. A battery pack comprising the battery module of claim 1.

* * * * *